(12) United States Patent
Singh et al.

(10) Patent No.: US 12,255,881 B2
(45) Date of Patent: Mar. 18, 2025

(54) SYSTEM AND METHOD FOR BYPASSING USER AUTHENTICATION THROUGH DATA ENCAPSULATION OF INTERACTION SESSION INFORMATION

(71) Applicant: Bank of America Corporation, Charlotte, NC (US)

(72) Inventors: Jitender Singh, Robbinsville, NJ (US); Matthew B. Bledsoe, Charlotte, NC (US); Jennifer Corzo, Ewing, NJ (US)

(73) Assignee: Bank of America Corporation, Charlotte, NC (US)

( * ) Notice: Subject to any disclaimer, the term of this patent is extended or adjusted under 35 U.S.C. 154(b) by 337 days.

(21) Appl. No.: 17/656,842

(22) Filed: Mar. 28, 2022

(65) Prior Publication Data
US 2023/0308425 A1    Sep. 28, 2023

(51) Int. Cl.
*H04L 9/40*    (2022.01)
(52) U.S. Cl.
CPC ................... *H04L 63/08* (2013.01)
(58) Field of Classification Search
CPC ...................................................... H04L 63/08
See application file for complete search history.

(56) References Cited

U.S. PATENT DOCUMENTS

| | | |
|---|---|---|
| 9,213,687 B2 | 12/2015 | Au |
| 9,779,557 B2 | 10/2017 | Hauser et al. |
| 10,187,337 B2 | 1/2019 | Smullen et al. |
| 10,423,948 B1 | 9/2019 | Wilson et al. |
| 10,484,540 B2 | 11/2019 | Fang et al. |
| 10,498,898 B2 | 12/2019 | Mazza et al. |
| 10,579,834 B2 | 3/2020 | Walia |
| 10,592,949 B2 | 3/2020 | Kannan |
| 10,671,749 B2 | 6/2020 | Galvez et al. |
| 10,796,102 B2 | 10/2020 | Galitsky |
| 10,817,670 B2 | 10/2020 | Galitsky |
| 10,880,435 B2 | 12/2020 | Fang et al. |
| 10,884,598 B2 | 1/2021 | Bhatt et al. |
| 10,938,817 B2 | 3/2021 | Han et al. |
| 10,963,525 B2 | 3/2021 | Nishant et al. |
| 11,030,412 B2 | 6/2021 | Kumar et al. |
| 11,050,683 B2 | 6/2021 | Ban et al. |
| 11,063,933 B2 | 7/2021 | Goldstone et al. |

(Continued)

*Primary Examiner* — Farid Homayounmehr
*Assistant Examiner* — Brian William Avery (57) ABSTRACT

An apparatus for bypassing user authentication comprises a memory and a processor. The processor is configured to receive a contextual payload for authentication of a first user and process the contextual payload to identify interaction session information associated with the first user. The processor is further configured to identify a file associated with the first user and a session classifier based on the interaction session information. In response to determining authentication information from the interaction session information, the processor is further configured to transmit file information associated with the file of the first user to an entity device associated with an entity and to transmit an instruction to display pre-populated fields in a process flow based on the identified session classifier on the entity device. The processor is further configured to establish a network connection between a first user device associated with the first user and the entity device.

14 Claims, 2 Drawing Sheets

(56) References Cited

U.S. PATENT DOCUMENTS

| | | |
|---|---|---|
| 11,146,566 B2 | 10/2021 | Barday et al. |
| 11,200,581 B2 | 12/2021 | Williams et al. |
| 2017/0180284 A1 | 6/2017 | Smullen et al. |
| 2017/0221032 A1 | 8/2017 | Mazed |
| 2017/0230312 A1 | 8/2017 | Barrett et al. |
| 2018/0082184 A1 | 3/2018 | Guo et al. |
| 2018/0357221 A1 | 12/2018 | Galitsky |
| 2019/0037077 A1 | 1/2019 | Konig et al. |
| 2019/0102345 A1 | 4/2019 | Singaraju et al. |
| 2019/0124020 A1 | 4/2019 | Bobbarjung et al. |
| 2019/0349321 A1 | 11/2019 | Cai et al. |
| 2020/0097577 A1* | 3/2020 | Nielsen ................. G06F 3/0482 |
| 2020/0143797 A1 | 5/2020 | Manoharan et al. |
| 2020/0366671 A1 | 11/2020 | Larson et al. |
| 2021/0042473 A1 | 2/2021 | Galitsky |
| 2021/0272127 A1* | 9/2021 | Mahalle ................ G06Q 20/425 |
| 2022/0004659 A1 | 1/2022 | Brannon et al. |

\* cited by examiner

SYSTEM AND METHOD FOR BYPASSING USER AUTHENTICATION THROUGH DATA ENCAPSULATION OF INTERACTION SESSION INFORMATION

TECHNICAL FIELD

The present disclosure relates generally to network communications. More particularly, in certain embodiments, the present disclosure is related to a system and method for bypassing user authentication through data encapsulation of interaction session information.

BACKGROUND

Existing communication systems connect users with an available agent to identify and address any concerns that the user is experiencing. When a user is connected to an agent, the user must be authenticated before the agent makes any changes to the user's account. This increases the amount of time spent resolving the user's concerns. While the agent is assisting the user, the network resources of the communication system are occupied. In addition to the network resources being occupied, the communication system's bandwidth and throughput also decrease. This limits the communication system's ability to assist other users.

SUMMARY

The system disclosed in the present application provides a technical solution to the technical problems discussed above by providing a communication system that is configured to connect the user with an agent that can resolve the user's concerns and bypass routine authorization processes. This process allows the communication system to improve resource utilization by avoiding situations where the agent has to manually verify the identity of the user prior to completing a process flow addressing the user's concerns. By improving resource utilization, the communication system is able to reduce the amount of time that the resources of the communication system are used while assisting users. By reducing the amount of time that the communication system's resources are used, the communication system is able to increase the bandwidth and throughput of the communication system. This means that the communication system is able to handle a larger volume of user interactions without requiring additional resources.

The disclosed system may further be integrated into a practical application of recognizing, interpreting, and processing voice signals, e.g., received from a user. Thus, the disclosed system may transform the received voice signal to textual information, e.g., using voice signal processing, natural language processing, etc. Similarly, the disclosed system may further be integrated into an additional practical application of creating an improved conversation agent that is capable of producing a more seamless conversation with a user based on detecting intent in speech received from the user with respect to the context of one or more previous responses.

Certain embodiments of this disclosure provide unique solutions to the technical problems identified above by providing improvements to underlying networking and computing technologies to achieve at least the following practical applications: 1) technology for enabling a communication system to handle a larger volume of user interactions without requiring additional resources; 2) technology for enabling a communication system to improve resource utilization by bypassing authorization of a user; 3) technology for enabling data encapsulation of a plurality of data prior to transmission; and 4) technology for enabling a communication system to recognize, interpret, and process user input through machine learning. This disclosure may improve the function of computer systems used to complete a process flow for a user and associated hardware infrastructures, such that, for example, the appropriate hardware (e.g., processing, memory, and networking resources) can be made available for other prioritized operations.

In an embodiment, an apparatus for bypassing user authentication comprises a memory and a processor. The memory is operable to store a plurality of accounts associated with a plurality of users. The processor is operably coupled to the memory and configured to receive a contextual payload for authentication of a first user. The processor is further configured to process the contextual payload to identify interaction session information associated with the first user and identify an account associated with the first user and a session classifier based on the interaction session information. In response to determining authentication information from the interaction session information and identifying the session classifier, the processor is further configured to transmit account information associated with the account of the first user to an entity device associated with an entity and to transmit an instruction to display pre-populated fields in a process based on the identified session classifier on the entity device. The processor is further configured to then establish a network connection between a first user device associated with the first user and the entity device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
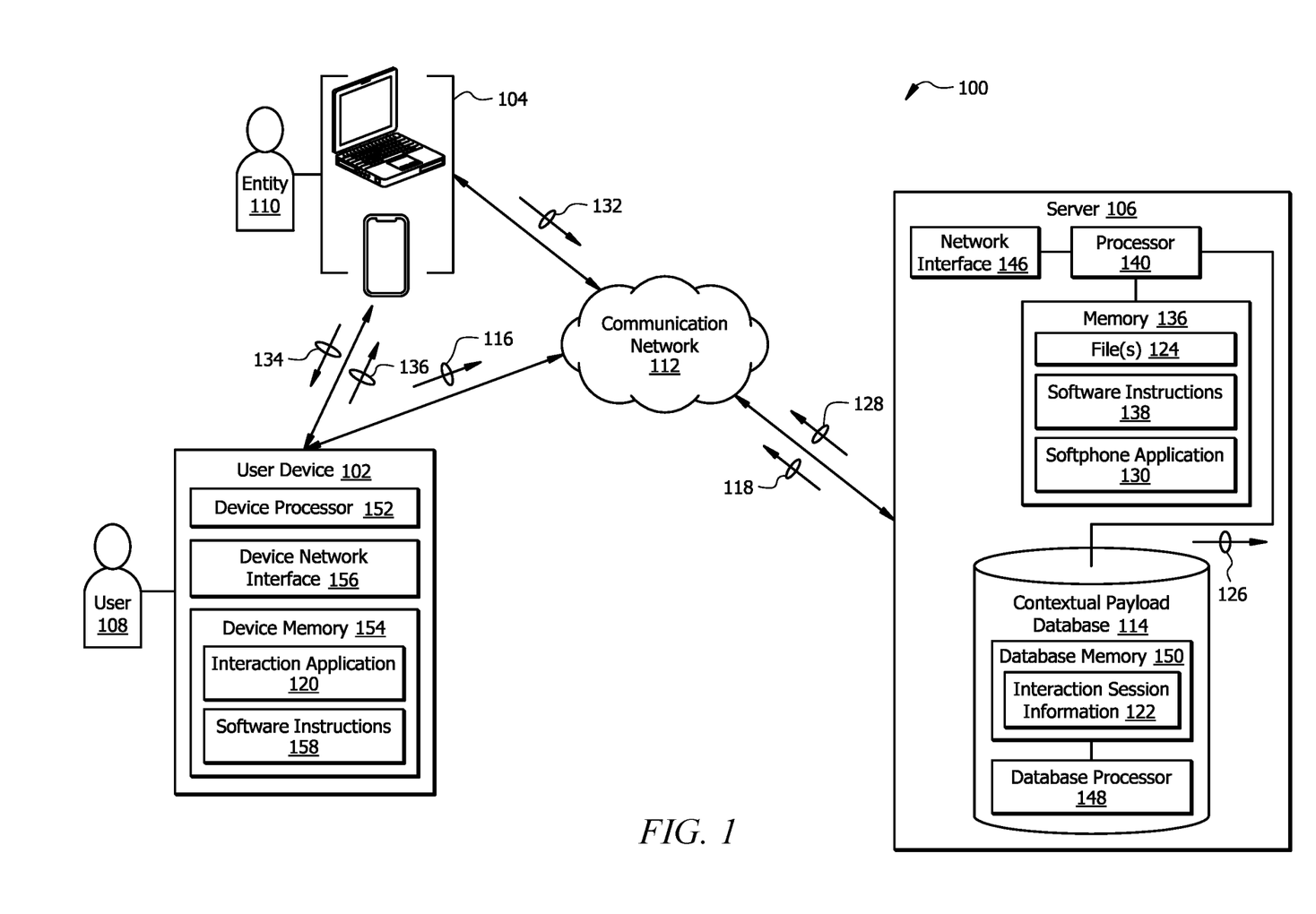
FIG. 1 is a schematic diagram of an example system for bypassing user authentication through data encapsulation of interaction session information.
Figure 2:
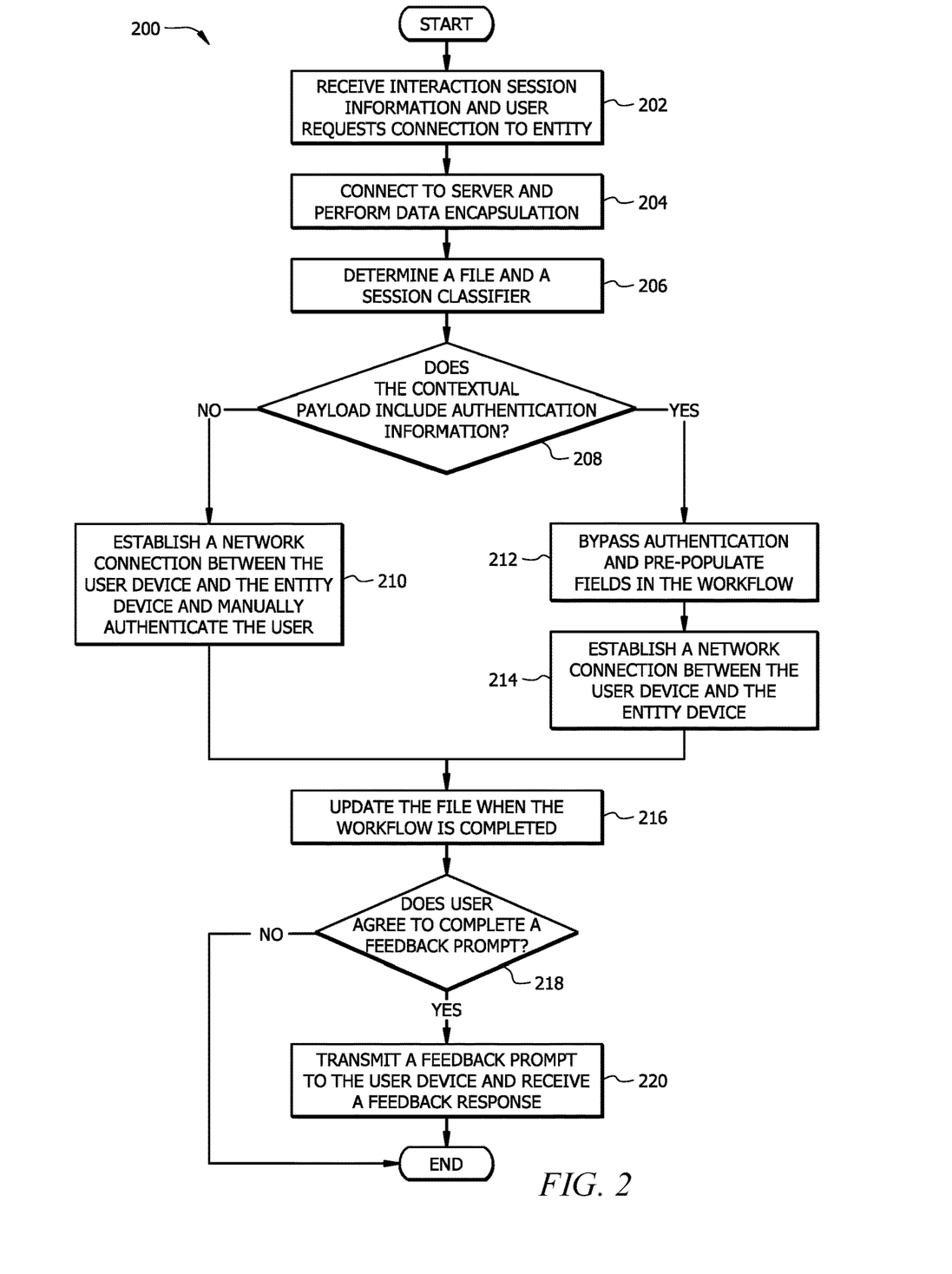
FIG. 2 is a flow diagram illustrating an example operation of the system of FIG. 1.

This disclosure provides solutions to the aforementioned and other problems of previous technology by using data encapsulation of interaction session information to bypass user authentication. FIG. 1 is a schematic diagram of an example system for bypassing user authentication through data encapsulation of interaction session information. FIG. 2 is a flow diagram illustrating an example operation of the system of FIG. 1.

Example System for Bypassing User Authentication Through Data Encapsulation of Interaction Session Information FIG. 1 illustrates a schematic diagram of an example system 100 configured to facilitate an interaction between a user device and an entity device and to bypass user authentication. The system 100 may include a user device 102, an entity device 104, and a server 106. A user 108 is associated with the user device 102, and an entity 110 is associated with the entity device 104. The system 100 may be communicatively coupled to a communication network 112 and may be operable to transmit data between each one of the user device 102, entity device 104, and the server 106 through the communication network 112. In general, the system 100 may improve electronic interaction technologies by managing an interaction session with the user device 102 and bypassing user authentication through the entity device 104 based on data encapsulation of interaction session information captured during the interaction session.

For example, in a particular embodiment, the user 108 may be anyone with concerns that needs assistance. An agent of the entity 1110 may be anyone who has knowledge or information that can assist a user. For example, the user 108 may need assistance with an electronic device or an online file. In this example, the agent may be a member of technical support. Prior to establishing a network connection with the agent to address the concerns, the user 108 may participate in an interaction session with a contextual payload database 114, wherein the contextual payload database 114 may attempt to identify the concerns. In embodiments, the contextual payload database 114 may use machine learning or any other suitable technique to identify an issue type that corresponds with concerns the user 108 is experiencing.

The user 108 may first request an interaction session with the contextual payload database 114 by transmitting a signal 116 that comprises the request through the user device 102. The contextual payload database 114 may receive the signal 116 and transmit a reply signal 118 to the user device initiating the interaction session. In an embodiment, the interaction session may be established via an interaction application 120. The user device 102 may be operable to send and receive communications to the contextual payload database 114 and/or the entity device 104 through the interaction application 120.

Throughout the interaction session, the contextual payload database 114 may receive and store interaction session information 122. The interaction session information 122 may include information associated with the identity of the user 108, a file 124 of the user 108, the user device 102 (i.e., IP address), a session classifier (the purpose for the interaction session, for example, to close a file), and any combination thereof. In embodiments, the user 108 may be required to log-in to the interaction application 120 using secured credentials in order to participate in the interaction session. Once logged-in, the user 108 may transmit the signal 116 via the user device 102. The contextual payload database 114 may prompt the user 108 to verify authentication within the interaction session. This verification of authentication information may also be stored as interaction session information 122.

At any point during the interaction session, the user 108 may select to be connected to the entity 110. The contextual payload database 114 may be communicatively coupled to the server 106, wherein the server 106 may facilitate communication between the user 108 and entity 110 by connecting the user device 102 to the entity device 104. The contextual payload database 114 may perform data encapsulation on the interaction session information 122 to produce a contextual payload 126, wherein data encapsulation may refer to bundling a plurality of data into a singular unit for further operations. In embodiments, the contextual payload 126 may be an encrypted, secured, and/or protected version of the interaction session information 122. The server 106 may receive the contextual payload 126 from the contextual payload database 114 and process or de-encapsulate the contextual payload 126 in order to parse through the interaction session information 122. The server 106 may then identify the file 124 associated with the user 108 based on file information collected during the interaction session. The server 106 may be operable to store a plurality of files 124 for a plurality of users. The server 106 may be configured to compare the interaction session information 122 to the plurality of files 124 in order to identify the file 124 associated with the user 108. The server 106 may further identify the session classifier as an actionable item based on the interaction session information 122. For example, the contextual payload database 114 may have stored the session classifier based on analyzing text and/or a voice signal produced by the user 108 through machine learning or any other suitable technique. Without limitations, a session classifier may include operable actions, such as "close a file," "open a file," "cancel a card," and the like.

In one or more embodiments, the interaction session information 122 may comprise the verification of authentication information of the user 108. In these embodiments, the server 106 may transmit a signal 128 comprising file information associated with the file 124 of the user 108 and instructions to display pre-populated fields in a process flow based on the identified session classifier to the entity device 104. For example, an agent of the entity 110 may assist the user 108 with concerns through the entity device 104. There may be various process flows associated with a given session classifier to be processed on the entity device 104. As the server 106 has previously identified the session classifier, the entity device 104 may automatically select and display the process flow associated with the session classifier based on the received signal 128. Further, the entity device 104 may pre-populate one or more fields in the designated process flow with the file information of the file 124 for the user 108 and with other interaction session information 122, as needed. The server 106 may then establish a network connection between the user device 102 and the entity device 104, wherein the network connection is established as a voice call between the user device 102 and the entity device 104 via a softphone application 130. After the entity 110 has completed the process flow based on user input, the entity device 104 may transmit a signal 130 to the server 106 indicating that the process flow is completed. The server 106 may update the file 124 associated with the user 108 based on the completed process flow.

In an embodiment wherein the session classifier is identified as unactionable, the signal 128 transmitted by server 106 may comprise the file information associated with the file 124 of the user 108 and instructions to display a plurality of process flows for selection via the entity device 104. For example, the user 108 may select to be connected to the entity 110 at the beginning of the interaction session with the contextual payload database 114. In this example, the contextual payload database 114 has not received enough information in order to determine the session classifier. In another example, the user 108 may not provide enough input or the right amount of input for the contextual payload database 114 to determine the session classifier based on machine learning or any other suitable technique. As the server 106 identified the session classifier as unactionable, selection of the process flow may be done by the entity 110 once a connection has been established with the user 108.

In an embodiment wherein the interaction session information 122 does not comprise the verification of authentication information of the user 108, the signal 128 transmitted by server 106 may comprise instructions to display a plurality of process flows for selection via the entity device 104. The server 106 may establish a network connection between the user device 102 and the entity device 104, wherein the entity 110 may undergo the process of authentication with the user 108 prior to addressing any concerns, and subsequently a related process flow, of the user 108.

Once the process flow has been completed, the entity 110 may prompt the user 108 to provide a feedback response. If the user 108 agrees, the user device 102 may receive a feedback prompt 134 from the entity device 104. The user device 102 may then transmit a feedback response 136 to the entity device 104 to be stored by the server 106. If the user 108 does not agree to complete the feedback prompt 134, the server 106 may update the file 124 associated with the user 108 based on the completed process flow.

The server 106 is generally a suitable server (e.g., including a physical server and/or virtual server) operable to store data in a memory 136 and/or provide access to application(s) or other services. The server 106 may be a backend server associated with a particular group that facilitates conducting interactions between entities and one or more users. Details of the operations of the server 106 are described in conjunction with FIG. 2. Memory 136 includes software instructions 138 that, when executed by a processor 140, cause the server 106 to perform one or more functions described herein. Memory 136 may be volatile or non-volatile and may comprise a read-only memory (ROM), random-access memory (RAM), ternary content-addressable memory (TCAM), dynamic random-access memory (DRAM), and static random-access memory (SRAM). Memory 136 may be implemented using one or more disks, tape drives, solid-state drives, and/or the like. Memory 136 is operable to store software instructions 138, the files 124, softphone application 130, and/or any other data or instructions. The software instructions 138 may comprise any suitable set of instructions, logic, rules, or code operable to execute the processor 140. In these examples, the processor 140 may be communicatively coupled to the memory 136 and may access the memory 136 for these determinations.

Processor 140 comprises one or more processors operably coupled to the memory 136. The processor 140 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 140 may be a programmable logic device, a microcontroller, a microprocessor, or any suitable combination of the preceding. The one or more processors are configured to process data and may be implemented in hardware or software. For example, the processor 140 may be 8-bit, 16-bit, 32-bit, 64-bit, or of any other suitable architecture. The processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 138. In this way, processor 140 may be a special-purpose computer designed to implement the functions disclosed herein. In an embodiment, the processor 140 is implemented using logic units, FPGAs, ASICs, DSPs, or any other suitable hardware. The processor 140 is configured to operate as described in FIGS. 1-2. For example, the processor 140 may be configured to perform the steps of method 200 as described in FIG. 2.

The server 106 may further comprise a network interface 142. Network interface 142 is configured to enable wired and/or wireless communications (e.g., via communication network 112). The network interface 142 is configured to communicate data between the server 106 and other devices (e.g., entity device 104 and user device 102), databases, systems, or domain(s). For example, the network interface 142 may comprise a WIFI interface, a local area network (LAN) interface, a wide area network (WAN) interface, a modem, a switch, or a router. The processor 140 is configured to send and receive data using the network interface 142. The network interface 142 may be configured to use any suitable type of communication protocol as would be appreciated by one of skill in the art.

As illustrated, the server 106 may further comprise the contextual payload database 114. The contextual payload database 114 may be a database operable to receive information (i.e., interaction session information 122) from the user device 102 for usage in authentication of the user 108. The contextual payload database 114 may include a database processor 148 and a database memory 150. The database processor 148 is communicatively coupled to and in signal communication with the database memory 150. Once the contextual payload database 114 receives the interaction session information 122, the database processor 148 may instruct the database memory 150 to store the interaction session information 122. The database processor 148 may perform data encapsulation on the received and stored interaction session information 122 to produce the contextual payload 126 in response to the user 108 selecting to be connected to the entity 110. The database processor 148 may be further operable to transmit the contextual payload 126 to the server 106. In other embodiments, the contextual payload database 114 may be external to and communicatively coupled with the server 106.

The communication network 112 may facilitate communication within the system 100. This disclosure contemplates the communication network 112 being any suitable network operable to facilitate communication between the entity device 104, user device 102, and the server 106. Communication network 112 may include any interconnecting system capable of transmitting audio, video, signals, data, messages, or any combination of the preceding. Communication network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

The user device 102 may be any computing device configured to communicate with other devices, such as entity device 104, servers (e.g., server 106), databases (e.g., contextual payload database 114), etc. through the communication network 112. The user device 102 may be configured to perform specific functions described herein and interact with entity 110, e.g., via its user interfaces. Examples of user devices 102 include but are not limited to mobile phones, wearable devices, tablet computers, laptop computers, servers, etc. The user device 102 may include a device processor 152, a device memory 154, and a device network interface 156. The user device 102 may be configured as shown or in any other suitable configuration.

The device processor 152 comprises one or more processors operably coupled to the device memory 154. The device processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The device processor 152 may be a programmable logic device, a microcontroller, a microprocessor, or any suitable combination of the preceding. The device processor 152 is communicatively coupled to and in signal communication with the device memory 154 and the device network interface 156. The one or more processors are configured to process data and may be implemented in hardware or software. For example, the device processor 152 may be 8-bit, 16-bit, 32-bit, 64-bit or of any other suitable architecture. The device processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-2. In some embodiments, the function described herein is implemented using logic units, FPGAs, ASICs, DSPs, or any other suitable hardware or electronic circuitry.

The device memory 154 is operable to store any of the information described with respect to FIGS. 1-2 along with any other data, instructions, logic, rules, or code operable to implement the function(s) described herein when executed by device processor 152. For example, the device memory 154 may store code for application(s) (for example, for interaction application 120) and/or software instructions 158, which are described below with respect to FIG. 2. The device memory 154 comprises one or more disks, tape drives, or solid-state drives, and may be used as an over-flow data storage device, to store programs when such programs are selected for execution, and to store instructions and data that are read during program execution. The device memory 154 may be volatile or non-volatile and may comprise read-only memory (ROM), random-access memory (RAM), ternary content-addressable memory (TCAM), dynamic random-access memory (DRAM), and static random-access memory (SRAM).

Typically, the user 108, who is a client of the entity 110, may access his/her file 124 on an interaction application 120 from his/her user device 102. Interaction application 120 may be a software application, a mobile application, a web application, and/or a software infrastructure associated with entity 110. The interaction application 120 is configured to provide a user interface to enable the user 108 to access his/her files, records, transfers to and from other users 108 or the entity 110, requests to the entity 110, etc. In one example, the interaction application 120 may be a web application on a website. In this example, the user 108 may access his/her files (via the interaction application 120) on the website once the user 108 is authenticated, e.g., by entering his/her username and password. In another example, the interaction application 120 may be a mobile application that is installed on the user device 102, such as a smartphone or a wearable device. In this example, the user 108 may access his/her files (via the interaction application 120) when the user 108 is authenticated, e.g., by entering his/her username and password on the interaction application 120. In embodiments, the server 106 may be associated with the interaction application 120. The user device 102 may transmit authorization to the server 106 through the communication network 112 in order to complete a process flow with the entity device 104.

The device network interface 156 is configured to enable wired and/or wireless communications. The device network interface 156 is configured to communicate data between the user device 102 and other network devices, systems, or domain(s). For example, the device network interface 156 may comprise a WIFI interface, a local area network (LAN) interface, a wide area network (WAN) interface, a modem, a switch, or a router. The device processor 152 is configured to send and receive data using the device network interface 156. The device network interface 156 may be configured to use any suitable type of communication protocol as would be appreciated by one of skill in the art.

The entity device 104 may be any suitable device for facilitating an interaction with the user device 102. For example, entity device 104 may be a register, a tablet, a phone, a laptop, a personal computer, a terminal, etc. The entity device 104 may be operable to receive information from a user device when a connection is established. The entity device 104 then may proceed to complete a process flow with that user device. The entity device 104 may include any appropriate device for communicating with components of system 100 over the communication network 112. As an example and not by way of limitation, entity device 104 may include a computer, a laptop, a wireless or cellular telephone, an electronic notebook, a personal digital assistant, a tablet, or any other device capable of receiving, processing, storing, and/or communicating information with other components of system 100. This disclosure contemplates entity device 104 being any appropriate device for sending and receiving communications over communication network 112. The entity device 104 may also include a user interface, such as a display, a microphone, keypad, or other appropriate terminal equipment usable by a user and/or the entity 110. In some embodiments, an application executed by entity device 104 may perform the functions described herein. As illustrated, the entity device 104 may be associated with the entity 110. The entity 110 may provide items or services to the user 108 in exchange for resources.

Example Operation of the System for Bypassing User Authentication Through Data Encapsulation of Interaction Session Information FIG. 2 is a flow diagram illustrating an example method 200 of the system 100 of FIG. 1. The method 200 may be implemented using the user device 102, entity device 104, and the server 106 of FIG. 1. The method 200 may begin at step 202 wherein the user device 102 (referring to FIG. 1) has already established an interaction session with the contextual payload database 114 (referring to FIG. 1). The database processor 148 (referring to FIG. 1) of the contextual payload database 114 may receive interaction session information 122 (referring to FIG. 1) from the user device 102 throughout the interaction session. The database processor 148 may instruct the database memory 150 (referring to FIG. 1) to store the received interaction session information 122. In embodiments, all data transmitted from the user device 102 to the contextual payload database 114 during the interaction session may be stored as interaction session information 122. During step 202, the user 108 (referring to FIG. 1) may select to be connected to the entity 110 (referring to FIG. 1). The contextual payload database 114 may receive this user input and proceed to step 204.

At step 204, the contextual payload database 114 may be communicatively coupled to the server 106 (referring to FIG. 1) via the communication network 112 (referring to FIG. 1), wherein the server 106 may facilitate communication between the user 108 and entity 110 by connecting the user device 102 to the entity device 104. After establishing a connection to the server 106, the database processor 148 may perform data encapsulation on the interaction session information 122 to produce a contextual payload 126 (referring to FIG. 1). In embodiments, data encapsulation may refer to bundling a plurality of data into a singular unit for further operations. The contextual payload 126 may be an encrypted, secured, and/or protected version of the interaction session information 122. The database processor 148 may then transmit the contextual payload 126 to the server 106.

At step 206, the processor 140 (referring to FIG. 1) of the server 106 may receive the contextual payload 126 from the contextual payload database 114 and process or de-encapsulate the contextual payload 126 in order to parse through the interaction session information 122. The processor 140 of the server 106 may then identify the file 124 (referring to FIG. 1) associated with the user 108 based on file information collected during the interaction session that is present within the interaction session information 122. In embodiments, the server 106 may be operable to store a plurality of files 124 for a plurality of users within the memory 136 (referring to FIG. 1). The processor 140 of the server 106 may be configured to compare the interaction session information 122 to the plurality of files 124 in order to identify the file 124 associated with the user 108. The processor 140 of the server 106 may further identify the session classifier based on the interaction session information 122. For example, the contextual payload database 114 may have stored the session classifier based on analyzing text and/or a voice signal produced by the user 108 through machine learning or any other suitable technique. For example, a session classifier may include operable actions, such as "close a file," "open a file," "cancel a card," and the like.

At step 208, the processor 140 of the server 106 may determine whether the interaction session information 122 comprises verification of authentication information of the user 108 after a determination of the session classifier and file 124 of the user 108. For example, the user 108 may have been required to log-in to the interaction application 120 (referring to FIG. 1) on the user device 102 using secured credentials in order to participate in the interaction session. Once connected to the contextual payload database 114, the contextual payload database 114 may prompt the user 108 to verify authentication within the interaction session. If the processor 140 of the server 106 determines that the interaction session information 122 comprises verification of authentication information of the user 108, the method 200 continues to step 212. Otherwise, the method 200 continues to step 210.

At step 210, the processor 140 of the server 106 may transmit the signal 128 (referring to FIG. 1) to the entity device 104 comprising instructions to display a plurality of process flows for selection via the entity device 104. For example, an agent of the entity 110 may assist the user 108 with concerns through the entity device 104. There may be various process flows associated with a given session classifier to be processed on the entity device 104. The processor 140 of the server 106 may establish a network connection between the user device 102 and the entity device 104, wherein the entity 110 may undergo the process of authentication with the user 108 prior to addressing any concerns, and subsequently a related process flow, of the user 108. The method 200 may then proceed to step 216.

With reference back to step 212, the processor 140 of the server 106 may transmit the signal 128 comprising file information associated with the file 124 of the user 108 and instructions to display pre-populated fields in a process flow based on the identified session classifier from step 206 to the entity device 104. As the server 106 has previously identified the session classifier, the entity device 104 may automatically select and display the process flow associated with the session classifier based on the received signal 128. Further, the entity device 104 may pre-populate one or more fields in the designated process flow with the file information of the file 124 for the user 108 and with other interaction session information 122, as needed. This may effectively bypass authentication of the user 108 by the entity 110. In this example, the entity 110 may not need to authenticate the user 108 as the user 108 has already provided authentication during the interaction session. The method 200 may then proceed to step 214.

At step 214, processor 140 of the server 106 may establish a network connection between the user device 102 and the entity device 104. In embodiments, the network connection may be established as a voice call between the user device 102 and the entity device 104 via a softphone application 130 (referring to FIG. 1). During step 214, the user 108 and entity 110 may address any concerns the user 108 may be experiencing. The method 200 may then proceed to step 216.

At step 216, after the entity 110 has completed the process flow based on user input, the entity device 104 may transmit the signal 130 (referring to FIG. 1) to the server 106 indicating that the process flow is completed. The server 106 may then update the file 124 associated with the user 108 based on the completed process flow. For example, the process flow may have been associated with a "cancel a card" session classifier. The processor 140 of the server 106 may instruct the memory 136 to store a change to the file 124 of the user 108 based on the completed process flow.

At step 218, the entity device 104 may determine whether the user 108 has agreed to complete the feedback prompt 134 (referring to FIG. 1). For example, the entity 110 may collect information related to performance of the agent who assisted the user 108. If the entity device 104 determines that the user 108 has agreed to complete the feedback prompt 134, the method 200 continues to step 220. Otherwise, the method 200 continues to end.

At step 220, the user device 102 may receive the feedback prompt 134 from the entity device 104, which may have previously received the feedback prompt 134 from server 106. The user device 102 may transmit the feedback response 136 (referring to FIG. 1) back to the entity device 104 for storage. Upon receiving the feedback response 136, the entity device 104 may send feedback response 136 to the server 106. The processor 140 of the server 106 may instruct the memory 136 to store the feedback response 136. After storing the feedback response 136, the method 200 continues to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for bypassing user authentication, comprising:
   a contextual payload database, the contextual payload database comprising:
      a database memory comprising an interaction application associated with an entity;
      a database processor operably coupled to the database memory, the database processor configured to:
         transmit a signal initiating the interaction session in response to receiving secured credentials from a first user device, wherein the secured credentials facilitate log-in to the interaction application associated with the entity to establish the interaction session;
         prompt the first user device to verify authentication information associated with a first user of the first user device during the interaction session on the interaction application associated with the entity;
         receive interaction session information associated with the interaction session, wherein the interaction session information comprises verification of the authentication information; and
         generate a contextual payload by performing data encapsulation on the verification of the authentication information;
   a memory operable to store a plurality of files associated with a plurality of users; and
   a processor, operably coupled to the memory, configured to:
      receive the contextual payload for authentication of the first user;
      process the contextual payload to identify the interaction session information associated with the first user;
      identify a file associated with the first user and a session classifier based on the interaction session information;
      in response to determining that the verification of the authentication information is present in the interaction session information and identifying the session classifier:
         transmit file information associated with the file of the first user to an entity device associated with the entity; and
         transmit an instruction to display pre-populated fields in a process flow based on the identified session classifier on the entity device; and
      establish a network connection between a first user device associated with the first user and the entity device.

2. The apparatus of claim 1, wherein establishing the network connection between the first user device and the entity device comprises establishing a voice call between the first user device and the entity device via a softphone application stored in the memory.

3. The apparatus of claim 1, wherein the processor is further configured to:
   receive a signal from the entity device indicating that the process flow is completed; and
   instruct the memory to update the file associated with the first user based on the completed process.

4. The apparatus of claim 1, wherein the processor is further configured to:
   in response to identifying the session classifier as unactionable:
      transmit the file information associated with the file of the first user to the entity device; and
      transmit an instruction to display a plurality of processes for selection on the entity device.

5. The apparatus of claim 1, wherein the processor is further configured to:
   provide a feedback prompt that comprises one or more questions to the entity device; and
   receive a feedback response from the entity device.

6. A method for bypassing user authentication, comprising:
   transmitting a signal initiating an interaction session in response to receiving secured credentials from a first user device, wherein the secured credentials facilitate log-in to an interaction application associated with an entity to establish the interaction session;
   prompting the first user device to verify authentication information associated with a first user of the first user device during the interaction session on the interaction application associated with the entity;
   receiving interaction session information associated with the interaction session, wherein the interaction session information comprises verification of the authentication information; and
   generating a contextual payload by performing data encapsulation on the verification of the authentication information
   processing the contextual payload to identify the interaction session information associated with the first user;
   identifying a file associated with the first user and a session classifier based on the interaction session information;
   in response to determining that the authentication information is present in the interaction session information and identifying the session classifier:
      transmitting file information associated with the file of the first user to an entity device associated with the entity; and
      transmitting an instruction to display pre-populated fields in a process flow based on the identified session classifier on the entity device; and
   establishing a network connection between a first user device associated with the first user and the entity device.

7. The method of claim 6, wherein establishing the network connection between the first user device and the entity device comprises establishing a voice call between the first user device and the entity device via a softphone application.

8. The method of claim 6, further comprising:
receiving a signal from the entity device indicating that the process flow is completed; and
updating the file associated with the first user based on the completed process.

9. The method of claim 6, further comprising:
in response to identifying the session classifier as unactionable:
transmitting the file information associated with the file of the first user to the entity device; and
transmitting an instruction to display a plurality of processes for selection on the entity device.

10. The method of claim 6, further comprising:
providing a feedback prompt that comprises one or more questions to the first user device; and
receiving a feedback response from the first user device.

11. A non-transitory computer-readable medium comprising instructions that are configured, when executed by a processor, to:
transmit a signal initiating an interaction session in response to receiving secured credentials from a first user device, wherein the secured credentials facilitate log-in to an interaction application associated with an entity to establish the interaction session;
prompt the first user device to verify authentication information associated with a first user of the first user device during the interaction session on the interaction application associated with the entity;
receive interaction session information associated with the interaction session, wherein the interaction session information comprises verification of the authentication information; and
generate a contextual payload by performing data encapsulation on the verification of the authentication information;
process the contextual payload to identify the interaction session information associated with the first user;
identify a file associated with the first user and a session classifier based on the interaction session information;
in response to determining that the verification of the authentication information is present in the interaction session information and identifying the session classifier:
transmit file information associated with the file of the first user to an entity device associated with the entity; and
transmit an instruction to display pre-populated fields in a process flow based on the identified session classifier on the entity device; and
establish a network connection between a first user device associated with the first user and the entity device.

12. The non-transitory computer-readable medium of claim 11, wherein establishing the network connection between the first user device and the entity device comprises establishing a voice call between the first user device and the entity device via a softphone application stored in a memory operably coupled to the processor.

13. The non-transitory computer-readable medium of claim 11, wherein the instructions are further configured to:
receive a signal from the entity device indicating that the process flow is completed; and
instruct a memory, operably coupled to the processor, to update the file associated with the first user based on the completed process.

14. The non-transitory computer-readable medium of claim 11, wherein the instructions are further configured to:
in response to identifying the session classifier as unactionable:
transmit the file information associated with the file of the first user to the entity device; and
transmit an instruction to display a plurality of processes for selection on the entity device.

\* \* \* \* \*